United States Patent [19]

Diggs

[11] 4,186,314
[45] Jan. 29, 1980

[54] HIGH EFFICIENCY WIND POWER MACHINE

[76] Inventor: Richard E. Diggs, P.O. Box 776, Carthage, Mo. 64836

[21] Appl. No.: 924,353

[22] Filed: Jul. 13, 1978

Related U.S. Application Data

[63] Continuation of Ser. No. 823,739, Aug. 11, 1977, abandoned, which is a continuation of Ser. No. 708,227, Jul. 23, 1976, abandoned.

[51] Int. Cl.² ............................................. F03D 5/02
[52] U.S. Cl. ...................................... 290/55; 290/44
[58] Field of Search ......................... 415/5; 416/7, 8; 290/44, 55

[56] References Cited

U.S. PATENT DOCUMENTS

| 206,289 | 7/1878 | Alger | 415/5 |
|---|---|---|---|
| 327,889 | 12/1885 | Main | 415/5 |
| 685,016 | 10/1901 | Towsley | 415/5 |
| 1,481,397 | 1/1924 | Tetetleni | 416/8 |
| 1,876,595 | 9/1932 | Beldimano | 290/44 |
| 2,403,564 | 7/1946 | Stein | 290/44 |
| 3,270,805 | 9/1966 | Glucksman | 415/5 |
| 4,049,300 | 9/1977 | Schneider | 415/5 |
| 4,140,433 | 2/1979 | Eckel | 290/55 X |

*Primary Examiner*—B. Dobeck
*Attorney, Agent, or Firm*—Shoemaker and Mattare, Ltd.

[57] ABSTRACT

A high efficiency wind power machine is disclosed which is particularly well suited for large-scale, commercial conversion of wind power into electrical energy. The wind power machine of the present invention employs highly efficient wind-to-electric power conversion modules which may be interconnected to form a large-scale power converter. The individual modules employs flip-flop wind blades which travel in an oval path and are carried by traveling chains. The blades interact with the impinging wind stream at two points, thus increasing the overall efficiency of the conversion modules.

5 Claims, 6 Drawing Figures

HIGH EFFICIENCY WIND POWER MACHINE

This is a continuation of application Ser. No. 823,739, filed Aug. 11, 1977, now abandoned, which is a continuation of Ser. No. 708,227, 7/23/76, now abandoned.

BACKGROUND OF THE INVENTION

1. Field of the Invention

The present invention relates to wind power utilization devices, and more particularly to a high efficiency wind power machine suitable for large scale, commercial utilization.

2. Description of the Prior Art

As fossil fuels become more expensive, and as the inescapable pollution hazards of nuclear power become more and more apparent, considerable interest has turned toward utilization of pollution-free natural energy sources, such as wind power. Wind power has been utilized for centuries as a means of propelling vessels across the sea and for operating pumping systems of the type utilized in Holland and other countries. For many years technological developments have slowly improved the efficiency of wind utilization apparatuses, although cheaply available fossil fuels have in the past all but eliminated the need for research into effective wind power conversion systems. Now that the age of cheap fossil fuels has past, research into improving the efficiency of wind power conversion systems has again begun in earnest. A number of improvements in wind power conversion systems have recently been disclosed, as for example in U.S. Pat. No. 4,035,658 disclosing a high-power wind turbine with kinetic accumulator. The apparatus disclosed in this application includes a modular wind power conversion system employing turbine-type blades and provides a technique for storing the power generated by these blades. A related development is disclosed in U.S. application Ser. No. 624,385, filed Oct. 21, 1975, now U.S. application Ser. No. 935,504, filed Aug. 21, 1978 which relates to a guided flow wind power machine which employs unique power conversion modules having fan blades of a generally tubular configuration. This device also includes a technique for storing energy generated by the fans. U.S. Pat. No. 3,970,917 closes an energy storage and DC to AC conversion system which is particularly suited for use with the previously mentioned wind power conversion systems.

Although the systems disclosed in these various applications constitute a significant improvement over earlier technological developments, it has been discovered that further improvements in wind power conversion efficiency are attainable by further technological innovations. For example, it is known that rotary turbine blades are somewhat inefficient in that the wind pressure is much less effective at the blade hub and tips than at the central portion of the blade, and also in than in a large surface area comprised of circular rotating blades, only 78% of the total area can be occupied by the blades, reducing the effective power conversion area of a given sized structure.

Guided flow structures having tubular fan arrangements of the type disclosed in application Ser. No. 935,504 are somewhat more efficient than circular blade arrangements in that a somewhat more uniform power conversion efficiency is permitted over the blade surface exposed to the impinging wind and in that a somewhat greater efficiency in useful percentage of total frontal area is provided. Nevertheless, greater improvements in efficiency have been sought for reducing the cost of producing commercial electrical power from wind power conversion units.

SUMMARY OF THE INVENTION

Accordingly, one object of this invention is to provide an improved apparatus for harnessing wind power.

Yet another object of the present invention is the provision of a wind power conversion unit of significantly improved efficiency.

A still further object of the present invention is the provision of a high efficiency wind power conversion module which is particularly well suited for assembly into a very large scale commercial wind power conversion machine.

Another object of the present invention is the provision of a large scale wind power conversion system for commercial use.

Yet another object of the present invention is the provision of a wind power conversion module employing flip-flop blades traveling on an oval track and including provisions for enabling a wind stream to strike the blades twice on each passage around the oval track.

Briefly, these and other objects of the present invention are achieved by the provision of a novel wind power conversion module comprised of a plurality of blades connected to a pair of traveling chains arranged to travel in an oval path. A first group of wind directing louvers are used to direct the wind into the vanes at an appropriate angle for imparting the maximum velocity to the vanes. A second plurality of wind directing louvers is positioned inside the oval path traversed by the vanes and directs the wind against the blades as they traverse a second portion of the oval path. Thus the wind engages each blade twice on its passage through the power conversion unit. The blades are coupled to the chain in a manner which permits them to change their orientation relative to the wind stream as they traverse the oval path. The power conversion modules are constructed so as to be particularly suitable for interconnection into a very large scale and highly efficient power conversion system.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
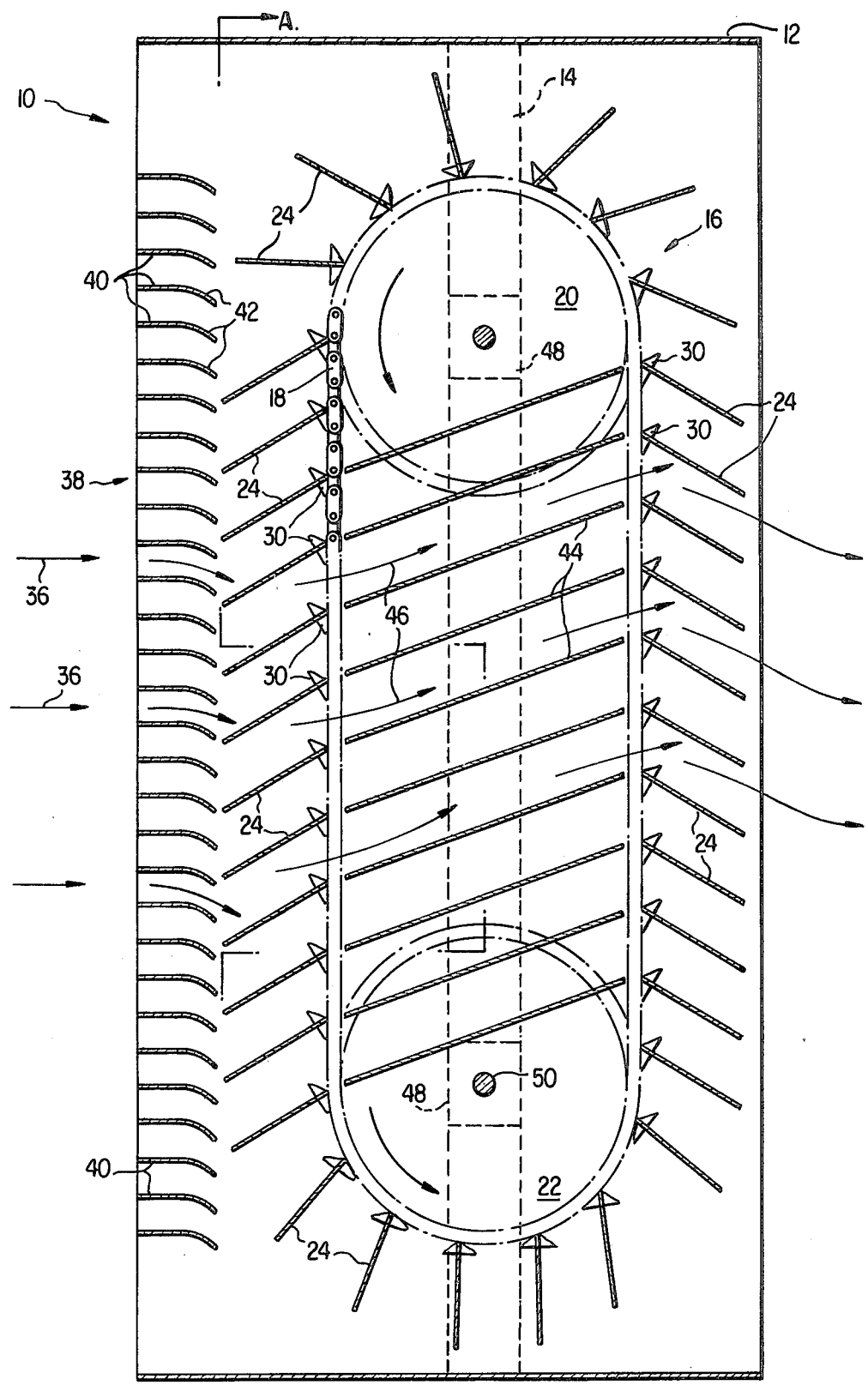
FIG. 1 is a cutaway side view illustrating the structural configuration of the novel power conversion modules of the present invention.
Figure 2:
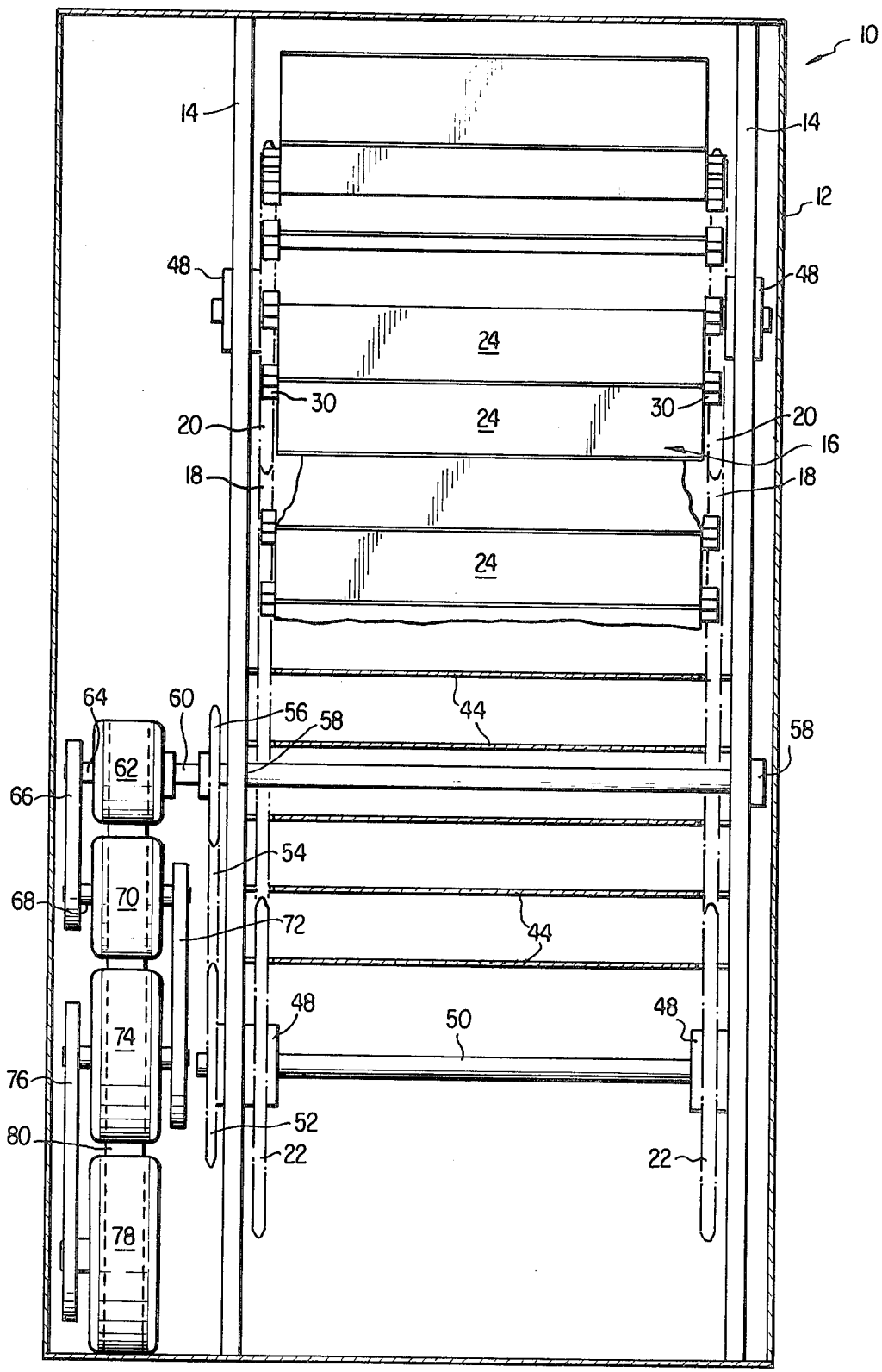
FIG. 2 is a partially cutaway frontal view of the apparatus illustrated in FIG. 1 taken along the line A-A' of FIG. 1.

Referring now to the drawings, wherein like reference numerals designate identical or corresponding parts throughout the several views, and more particularly to FIG. 1 thereof, a flip-flop power conversion module in accordance with the teachings of the present invention is referenced generally by the numeral 10. The power conversion module 10 includes a surrounding framework 12 within which a pair of vertical supports 14 carry the moving vane assembly 16.

The moving vane assembly includes two parallel traveling chains 18, of which only one is visible in FIG. 1. The chains travel in an oval path around a pair of top sprocket idlers 20 and a similar pair of bottom sprocket idlers 22.

A plurality of flip-flop vanes 24 are coupled to the chains 18, and provide the means for converting wind velocity into a force for propelling the chains. Although 35 flip-flop vanes are shown coupled to the chains 18, the number illustrated is not at all critical, and can be increased or decreased by wide margins depending only upon the environment in which the wind power conversion system is to be used. Similarly, the overall size of the vanes and the corresponding size of the module 10 may be varied over a wide margin, although for commercial power generating purposes, it is envisioned that the vanes 24 be approximately 10 meters wide and that the overall height of the oval path traversed by the blades be approximately 20 meters, although these dimensions are by no means critical, and the blades can be reduced to dimensions of a few centimeters for model or display purposes without adversely effecting their operativeness.

Figure 3:
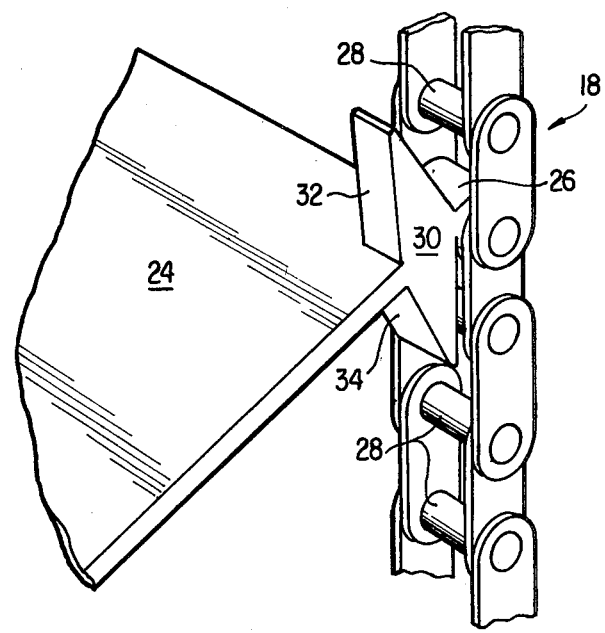
FIG. 3 is a perspective illustration showing in detail the coupling between the flip-flop blades of the present invention and the traveling chain.

The details of the structure by which the vanes are coupled to the chains is illustrated in FIG. 3. Referring to FIG. 3, the rear corners of each vane 18 have formed integrally therewith or coupled thereto a sleeve bearing 26 which includes an aperture sized to fit over one of the link bearings 28 of the chain 18. Thus the flip-flop vanes 24 are pivotally mounted about an axis defined by the link bearings of the two traveling chains 18. The extent to which the vanes 24 can pivot is controlled by flip limit braces 30 which are preferably formed integral with the sleeve bearings 26, and are positioned at both rear corners of the vanes 24. The flip limit braces 30 are preferably, although not necessarily, symmetrical in shape, and have projections 32 and 34 extending respectively above and below the surface of each vane 24. The projections 32 and 34 are designed to abut the link bearings 28 of the chains 18 to thereby limit the angular movement of the vanes 24. The angle between the rear or abutting surface of each of the projections 32 and 34 and a line perpendicular to the plane of each vane 24 determines the angular freedom of the vane. In particular, each vane is permitted to move through twice this angle, provided the angles of the rear or abutting faces of the upper and lower projections 32 and 34 are equal. Unequal angles, which may be desirable for some purposes to improve the efficiency of the apparatus, may also be utilized, depending upon design considerations. In practice the angle in question may be selected as 30°, so that the blades 24 may rotate through a total angle of 60° as they travel from one side of the oval chain path to the other.

The normal direction of wind impinging on the power conversion module 10 is denoted by a plurality of arrows 36. Wind flowing in the direction of the arrows 36 passes through a louver assembly 38 positioned at the front of the framework 12. The louver assembly comprises a plurality of stationary wind guide vanes 40 having downwardly curved end segments 42 for directing the impinging wind in a direction that is at a sharp angle relative to the planes of the flip-flop blades 24, thereby imparting maximum wind force to the vanes.

The wind force imparted to the vanes 24 naturally causes them to move in a downward direction (on the left side of FIG. 1). However, the energy imparted to the blades does not exhaust the wind energy and accordingly the wind impinging initially impinging on the vanes 24 retains some velocity and thus some unexpended energy. This wind having a residual velocity passes over the vanes and through the chains 18 to be directed upwardly by a plurality of internal wind vanes 44 positioned in the region between the chain sprockets 20 nd 22. These vanes direct the wind upwardly in a direction generally defined by the arrows 46. The wind then impinges on the lower surface of the vanes 24, tending to urge the blades in an upward direction. Thus the wind passing through the illustrated apparatus first engages the vanes 24 on the left side of the apparatus, urging them in a downward direction, and again engages the blades on the righthand side of the apparatus urging them in an upward direction, whereby the overall efficiency of the apparatus is enhanced, and maximum energy is extracted from the impinging windstream. It is noted that the vanes 24 are positively locked in position against the wind pressure at the lefthand side of the apparatus since the wind pressure presses the flip limit braces directly against the chains 18, and the vanes 24 are thus unable to pivot with the wind stream, and must be driven in a downwardly direction. On the other hand, the vanes 24 are not positively locked in position at the righthand side of the structure illustrated in FIG. 1, but are merely supported in position against the chain 18 by the flip limit braces 30. In other words, on the righthand side of the apparatus the flip limit braces do not restrict the motion of the vanes 24 relative to the windstream, and the windstream, if strong enough, can raise the vanes 24 away from the angle in which they are normally supported. Nevertheless, the action of the wind on the lower surfaces of the vanes acts against the pivoted weight of the vanes 24, and thus improves the overall efficiency of the wind power conversion apparatus by significantly reducing the net inertial force required to be overcome by the impinging windstream at the lefthand side of the apparatus.

As an alternative to the structure described above, a positive mechanical locking arrangement can be utilized for positively locking the vanes in the position illustrated at the righthand side of FIG. 1. Such a positive mechanical locking device would require a locking cam or latching assembly in the vicinity of the bottom sprocket idler 22 to lock the vanes 24 in th proper angle position, and a similar unlatching cam in the vicinity of the top sprocket idler 20 for releasing the latch, to permit the vanes to flop into the angular position illustrated at the lefthand side of the figure. In this case, the energy of the windstream impinging upon the lower surfaces of the vanes 24 at the righthand side of the apparatus would be largely transmitted to the vanes, and would further increase the wind power convesion efficiency of the illustrated apparatus. The efficiency of the illustrated apparatus is significantly greater than previously known devices because, as mentioned above, the wind passing through the device must hit each vane twice as it goes through the module, and because the vane surface covers essentially 100% of the frontal area of the apparatus exposed to the wind. Furthermore, the apparatus is always arranged at the optimum angle to obtain maximum pressure differential across the blade faces and furthermore all portions of each vane travel at the same optimum speed to produce maximum power output at any stated wind velocity. In addition, all vanes may be set at a selected angle which produces a maximum wind thrust on each blade. Furthermore, the overlapping vane area of the illustrated apparatus enhances the wind trapping efficiency of the device. In addition, the use of a straight vane path permits greater efficiency than a rotary path wherein maximum efficiency is only attained at one position on the rotating blades, while little effect is achieved at the blade hub or tip areas. Accordingly the illustrated and described flip-flop vane power conversion module is considered to represent a dramatic step forward in increased wind-to-mechanical power conversion technology.

Output power is derived from the flip-flop vane assembly by a mechanical and electrical network which will now be described in detail. More particularly, the top and bottom sprocket idlers 20 and 22 are rotatably mounted to vertical supports 14 by means of suitable shaft bearings 48. The bottom sprocket idler is connected by means of a directly driven shaft 50 to a power output sprocket 52. The output sprocket 52 is coupled by means of a suitable drivebelt or chain 54 to a first stage generator drive sprocket 56.

The first stage generator drive sprocket 56 is secured to the vertical supports 14 by a pair of shaft bearings 58 for purposes of stability. The drive sprocket 56 is connected to the drive shaft 60 of a first stage generator 62, which is in turn coupled at its output shaft 64 through a centrifugal clutch 66 to a drive shaft 68 of a second stage generator 70. The second stage generator 70 is similarly coupled through a second centrifugal clutch 72 to a third stage generator 74, which is likewise coupled through a third centrifugal clutch 76 to a fourth stage generator 78. The four generators are physically coupled to a vertical generator support 80, which may comprise a vertical I-beam segment for example. A similar vertical support, not shown in the drawings, may be positioned in front of the generators to provide additional support.

The first stage generator 62 is preferably a relatively small generator, such as a five horsepower DC generator, for example, and is designed to run continuously whenever the vanes 24 are driven by wind power. The centrifugal clutch 66 is designed so that the second stage generator 70 is energized after the first stage generator 62 reaches a predetermined rotational speed. The second stage generator is preferably a larger generator of, for example, fifteen horsepower capacity. The second stage generator is similarly coupled to the third stage generator 74 by a centrifugal clutch 72 so that the third stage generator is energized when the second stage generator reaches a sufficient speed. A similar centrifugal clutch arrangement couples the third and fourth stage generators to permit the fourth stage generator 78 to be energized when the third stage generator has reached a desired speed. The third stage generator preferably has a larger capacity, such as approximately thirty horsepower and the fourth stage generator preferably is the largest of the four generators having a capacity on the order of 75 horsepower. The centrifugal clutches 66, 72 and 76 are set to run at sequentially higher speeds with the increasing size of the generators. The arrangement enables a sequentially increased load, and consequently a sequentially increased power output to occur as the vanes 24 are accelerated by increasing wind power. The combination of four generators enables the unit to convert the maximum amount of wind power into electrical energy for winds up to 125 miles an hour.

Efficiency of the unit may be further improved by adjusting the relative sizes of the sprockets 54 and 56 to increase the generator drive speed, or by including a gear driven or otherwise constructed arrangement for increasing the generator drive speed relative to the power output sprocket speed.

The operation of the power conversion module thus described is as follows. The forward face of the module is directed into the wind stream which is identified by the arrows 36. The impinging wind is channeled through the guide vanes 40 and is directed downwardly at a suitable angle against the top surfaces of the downwardly oriented vanes 24, propelling the vanes in a downward direction. The downwardly driven vanes drive the chains 18 and accordingly drive the power output sprocket 52 and the generators attached thereto. As the individual vanes 24 reach the bottom of the bottom sprocket idler 22, they fall to a vertical position, and gradually fall to a downward sloping position as they move upwardly from the bottom sprocket idler 22. As the vanes 24 rise toward the top sprocket idler 20, they are reversed in direction relative to their original position and the original top surface of the vanes now becomes the bottom surface thereof. Wind identified by the arrows 46 is channeled through the internal wind vanes 44 and impinges upon the lower surface of the upwardly moving vanes 24 at the rear or exhaust side of the module, thus increasing the driving force acting upon the vanes. This increase in driving force is similarly transferred to the various generators 62, 70, 74 and 78 which are engaged in stages, as mentioned previously, depending upon the speed of the power output sprocket 52.

Figure 4:
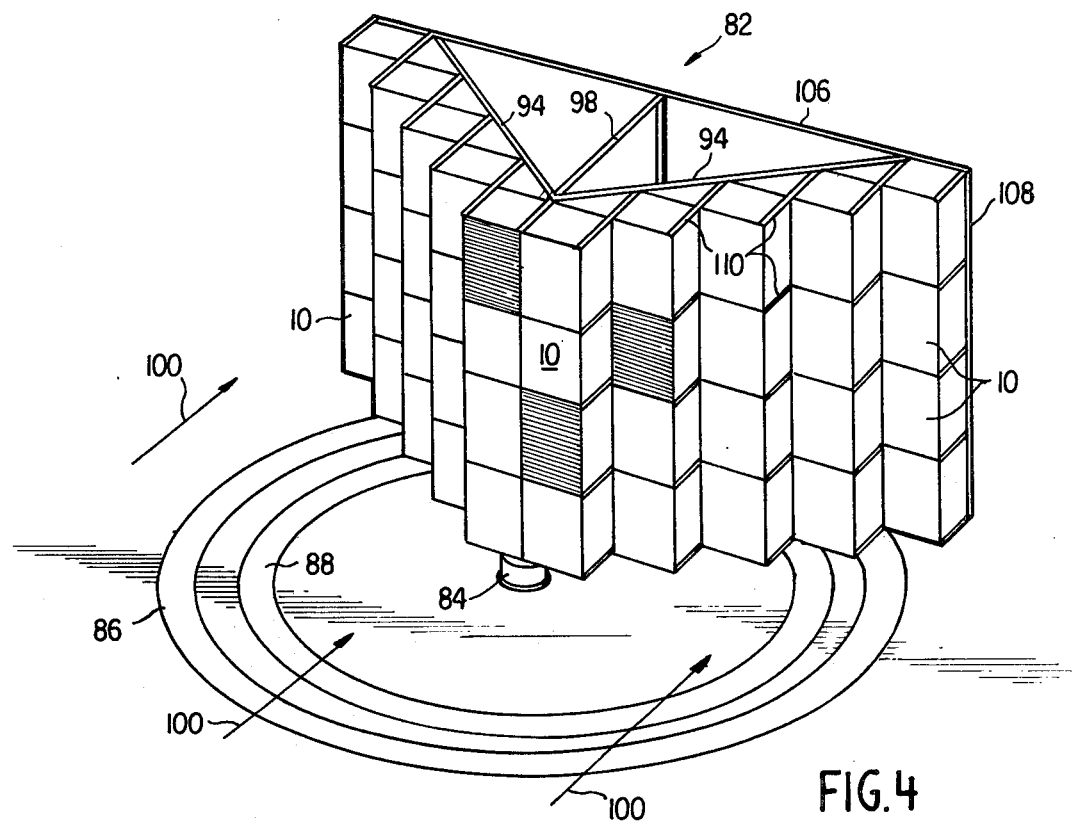
FIG. 4 is a perspective illustration of a large scale power conversion system employing a number of power conversion modules of the type illustrated in FIG. 1.
Figure 5:
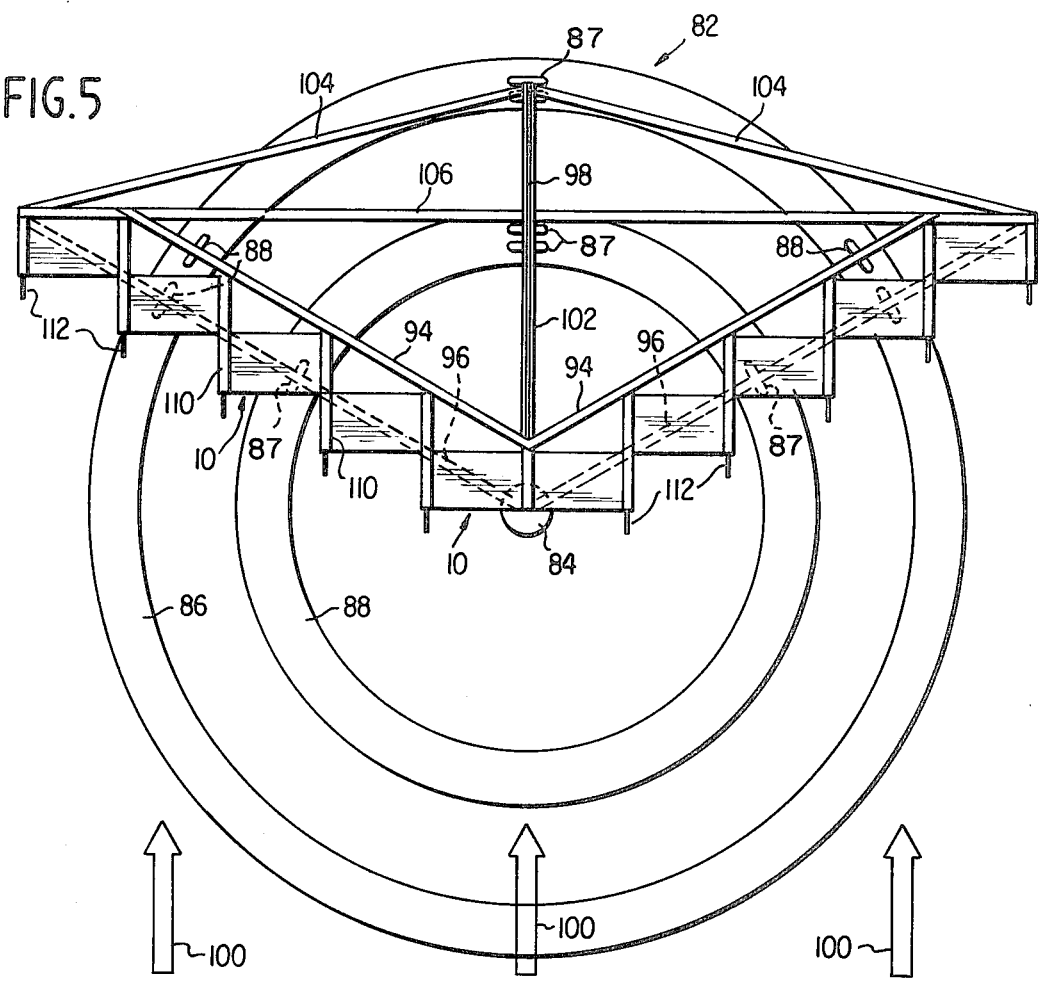
FIG. 5 is a top view of the large scale power conversion system illustrated in FIG. 4.
Figure 6:
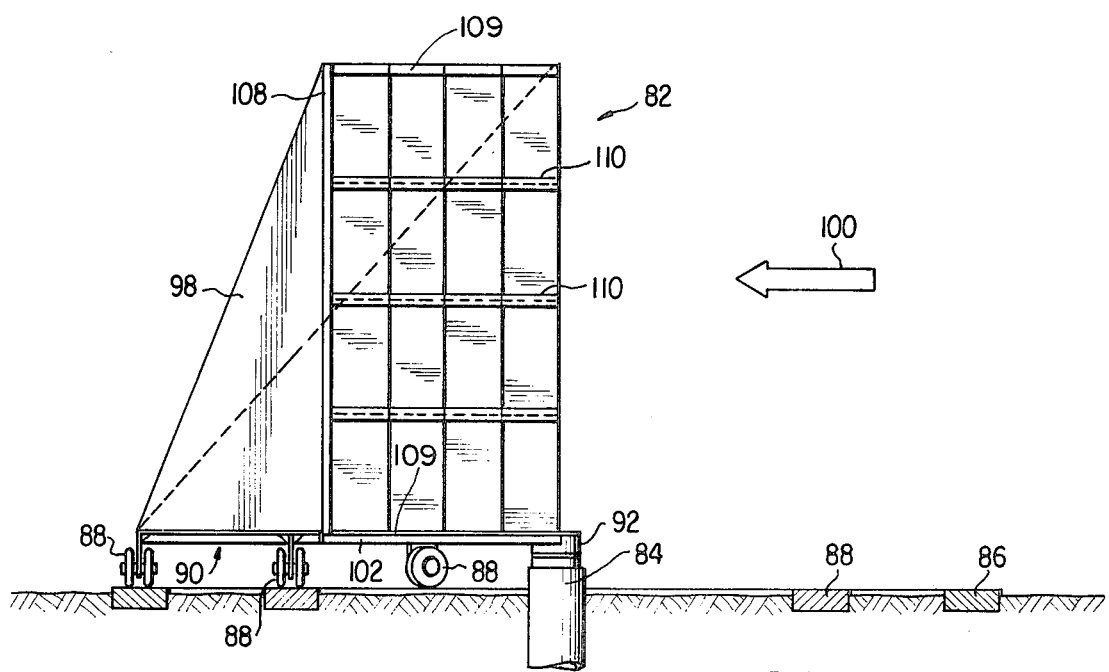
FIG. 6 is a side view of the large scale power conversion system illustrated in FIGS. 4 and 5.

Referring now to FIGS. 4, 5 and 6, the individual power conversion modules of the present invention can be combined into a large scale commercial power generating apparatus. FIG. 4, for example, illustrates a commercial power conversion unit 82 comprised of forty power conversion modules 10 arranged in 10 staggered rows. Given the previously set forth dimensions of each module, the commercial power conversion unit 80 would measure 80 meters high by 100 meters wide, and given the power capacities of the various generators set forth above, the maximum power output of the unit would amount to approximately 5,000 horsepower. Naturally, the dimensions and total power capacity of the unit can be varied over a wide range depending upon design and power output requirements.

The illustrated unit is anchored to a central pier 84 and rotates on a pair of reinforced concrete circular tracks 86 and 87. The unit rotates on heavy duty aircraft-type wheels 88 which are secured to a frame undercarriage 90. The entire unit pivots about the central pier 84 which also includes an internal power collecting ring 92. The power collecting ring is a major electrical bus at which the electrical power produced by the generators of the multiple power conversion modules is accumulated and delivered to either an output device or a large power storage device. The details of this structure are disclosed in the previously mentioned applications, particularly U.S. Pat. No. 4,035,658 and application Ser. No. 935,504. This patent and applications also disclose details of various power reservoir or accumulating systems, as does the remaining patent referenced above. U.S. Pat. No. 3,970,917. It will be appreciated by those skilled in the art that the power produced by the present invention can be stored and utilized in the manners and using the apparatuses disclosed in these referenced applications. Furthermore, these applications contain details of the frame structure, wheel support and innerconnection systems and other structural features suitable for construction of the commercial power conversion unit 82 illustrated in FIGS. 4, 5 and 6.

Further structural details of the commercial power unit 82 are evident from FIG. 5. Specifically, the power unit frame includes a pair of upper and lower lateral frame members 94 and 96, respectively on opposite sides of a central brace member 98. The upper and lower lateral frame members are connected at the center of the structure in an angular fashion so as to define an interior angle of approximately 120°, thereby providing a sloped, or angular frontal surface facing into the wind. The central brace member 98 is constructed to serve as an airfoil fin to guide the entire unit 82 relative to the wind direction, and to keep the entire unit facing directly into the wind for maximum power output. It is noted that in FIGS. 4, 5 and 6 the wind direction is denoted by arrows 100.

The lower lateral frame members 96 are connected to a central undercarriage brace at the center of the unit. The central undercarriage brace extends to the rear of the unit where it is coupled to the junction of two rear lateral undercarriage braces 104 which extend in an angular fashion to the outer tips of a main lateral frame member 106 which extends across the entire width of the unit 82. The rear lateral undercarriage braces 104 are set at an angle with respect to the main lateral brace to form a triangulated structure of exceptional strength and rigidity. Similarly, the upper and lower lateral frame members 94 nd 96 are joined to the main lateral frame 106 to form an additional triangulated structure of exceptional strength and rigidity facing toward the front of the unit 82. It is noted that the main lateral frame 106 includes vertical members 108 positioned on opposite sides of the unit 82, as well as top and bottom members 109 extending laterally across the unit 82 so that the frame members 106 and 108 together form a rectangular framework extending around the entire periphery of the unit 82 at the rear face thereof.

The individual power conversion modules 10 are slidably and removably inserted into framed compartments constructed at the front of the unit 82 by the use of pluralities of angle girders 110 welded or otherwise secured to the upper and lower lateral frame members 94 and 96. Appropriate vertical reinforcing members (not shown in the drawings) may also be included to structurally reinforce the angle girders 110 to improve their structural strength for supporting the power conversion modules 10. The angle girders essentially include right-angle frame members spaced to receive the corners of the surrounding framework 12 of each of the power conversion modules. Wind trap vanes 112, shown most clearly in FIG. 5, are mounted to the angle girders 110 to provide wind trapping compartments adjacent to each of the power conversion modules for directing the wind flow into the individual power conversion modules.

In practice a repair crane may be installed on top of the commercial power unit 82 for selectively removing and replacing the individual power conversion modules 10 when they are in need of servicing or repair. Other types of conventional cranes could also, of course, be used to remove or replace damaged modules.

It will be appreciated from the foregoing disclosure that a unique flip-flop blade power conversion module for converting wind power into electrical energy has been disclosed, and also that a commercial wind power conversion station comprising a plurality of electrically interconnected power conversion modules has also been disclosed herein. The module and the overall commercial power conversion unit are not in any way restricted with regard to their specific dimensions, or with regard to the number of individual power conversion modules employed in the overall commercial power conversion unit. Thus the unit can be used for large or small scale power production and the modules as well s the assembled power conversion unit can be constructed and made operative over widely varying structural scales, from miniature or toy size to enormous high-power units of several hundred meters height and breadth.

Obviously, numerous modifications and variations of the present invention are possible in light of the above teachings. It is therefore to be understood that within the scope of the appended claims, the invention may be practiced otherwise than as specifically described herein.

What is new and intended to be secured by Letters Patent is:

1. A wind power conversion structure comprising:
  a plurality of modules, each module including:
  a supporting structure mounted so that wind moves from an upstream side of said supporting structure to a downstream side thereof;
  a sprocket wheel rotatably mounted on said supporting structure;
  a power generating means mounted on said supporting structure and connected to said sprocket wheel to be operated by rotation of said sprocket wheel;
  an endless chain trained around said sprocket wheel to define an elongate loop having a longitudinal axis which is oriented to be essentially vertical so that said chain has an upstream reach located adjacent said supporting structure upstream side and a downstream reach located adjcent said supporting structure downstream side;
  a multiplicity of planar guide vanes mounted on said supporting structure to extend transversely across said supporting structure from a point immediately adjacent said upstream reach to a point immediately adjacent said downstream reach to define a multiplicity of linear raceways through which air flowing through said supporting structure is conducted in a multiplicity of separate rectilinear paths through said structure from said upstream reach of said chain to said downstream rech thereof so that a substantial portion of the area within said chain loop is subdivided into a multiplicity of separate rectilinear paths by said guide vanes; and
  a plurality of planar blades pivotally connected to said chain to extend outwardly of said chain loop in both of said reaches and to tilt downwardly in said chain reaches so that air located on said upstream side of said structure contacts said blades when they are located in said upstream reach and air exiting from said raceways contacts said blades when they are located in said downstream reach so that said blades are impacted by air at least twice during a single revolution of said chain about said sprocket wheel a supporting frame for said plurality of modules including:

a central pier rotatably anchored in a supporting means and having an internal power collecting ring mounted thereon;

a pair of circular tracks surrounding said central pier;

a frame undercarriage which includes a central brace member connected at one end thereof to said central pier, said central brace member being constructed to serve as an airfoil fin to guide the power conversion structure into a wind facing orientation, a pair of lower lateral frame members each connected at one end thereof to said central pier to form an angle of about 120° with each other and being located on opposite sides of said central brace member, a main lateral frame member extending across essentially the entire width of the power conversion structure, a pair of rear lateral undercarriage braces coupled together and to another end of said central brace member to extend in an angular manner to the outer tips of said main lateral frame member and coupled thereto to define a triangular configuration, a plurality of wheels mounted on said frame undercarriage and riding in said circular tracks to guide the power conversion structure, a plurality of vertical support members fixed at lower ends thereof to said main lateral frame member and extending upwardly therefrom, a pair of upper lateral frame members joined to said vertical support members and to each other to define an angle of about 120° with each other adjacent said central pier, top and bottom main frame members extending laterally across the power conversion structure and connected to said main lateral frame member and to said vertical support members to define a rectangular framework extending essentially entirely around the periphery of the power conversion structure at a rear face thereof, a plurality of angle girders secured to said upper and lower lateral frame members forming a plurality of module accommodating compartments; and a plurality of wind trap vanes mounted on said angle girders to define wind trapping compartments adjacent each module accommodating compartment for directing wind into power conversion modules accommodated in each compartment.

2. A structure as in claim 1, wherein:
said power generating means comprises a plurality of individual generators coupled together by centrifugal clutch means for allowing sequential generator actuation.

3. A structure as defined in claim 1, further including:
a plurality of guide means on said support structure having downturned end segments for channelling impinging wind onto said wind vane means.

4. A structure as in claim 1, further including:
a brace means on each planar blade for limiting angular movement of said blade relative to said endless chain.

5. The apparatus defined in claim 1, wherein said sprocket wheel is a first sprocket wheel and further including a second sprocket wheel rotatably mounted on said supporting structure to be vertically spaced from said first sprocket wheel, said chain being trained about said second sprocket wheel.

* * * * *